May 13, 1930.  T. T. WRIGHT  1,758,384
WEEDER
Filed Aug. 28, 1926  4 Sheets-Sheet 1
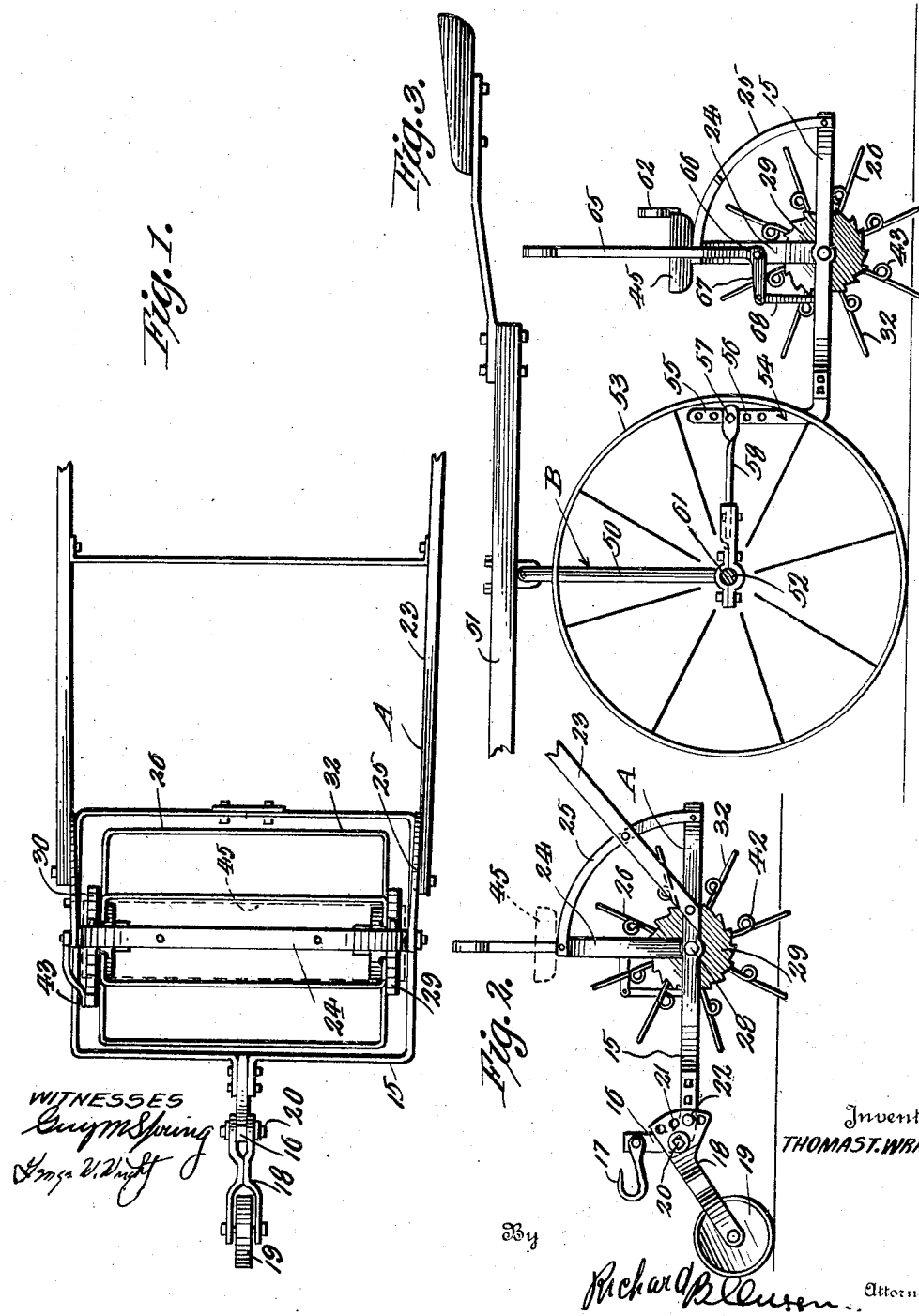
WITNESSES
Inventor
THOMAS T. WRIGHT May 13, 1930. T. T. WRIGHT 1,758,384
WEEDER
Filed Aug. 28, 1926 4 Sheets-Sheet 2
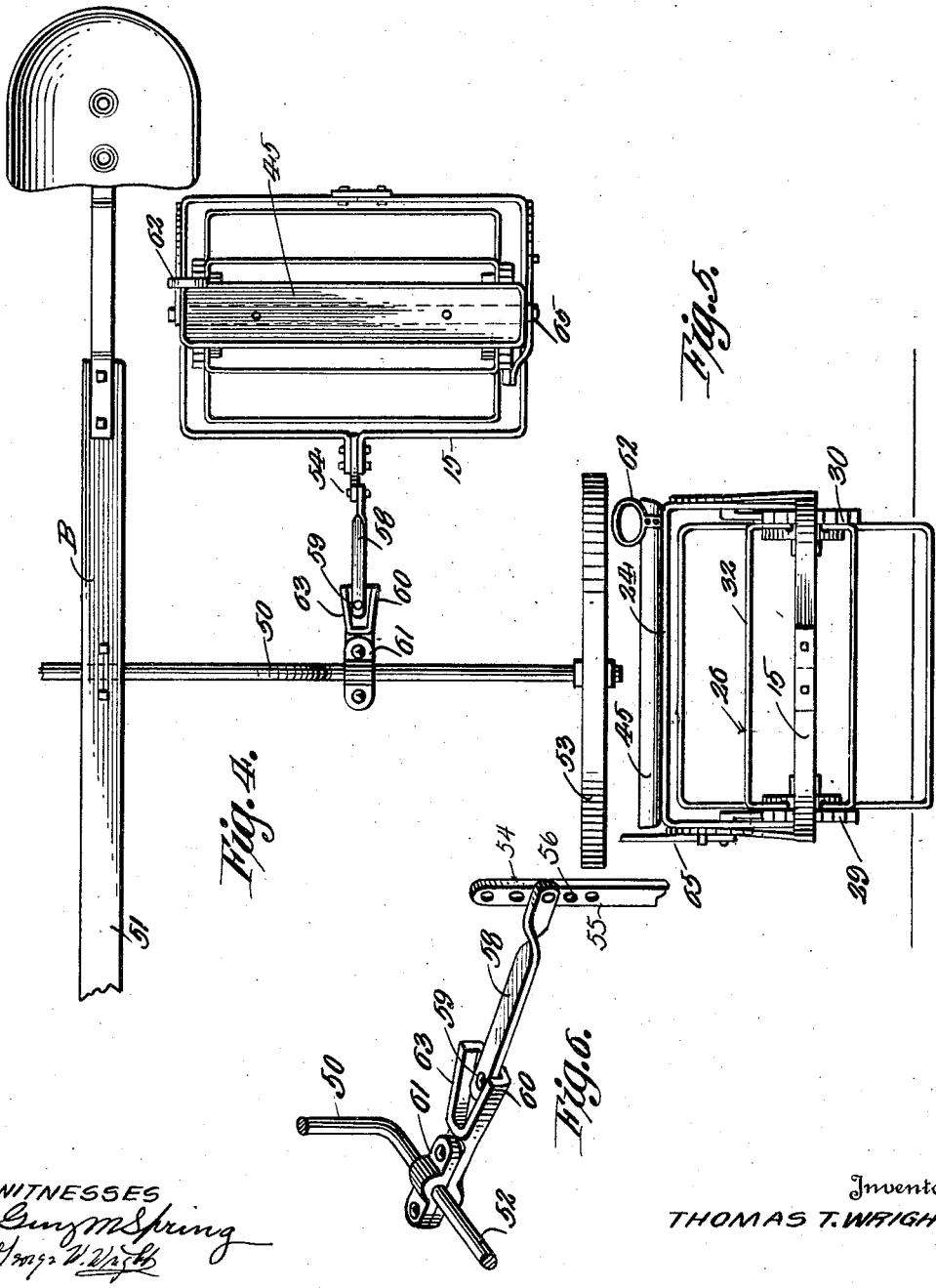
WITNESSES
Inventor
THOMAS T. WRIGHT
By Richard B. Owen
Attorney

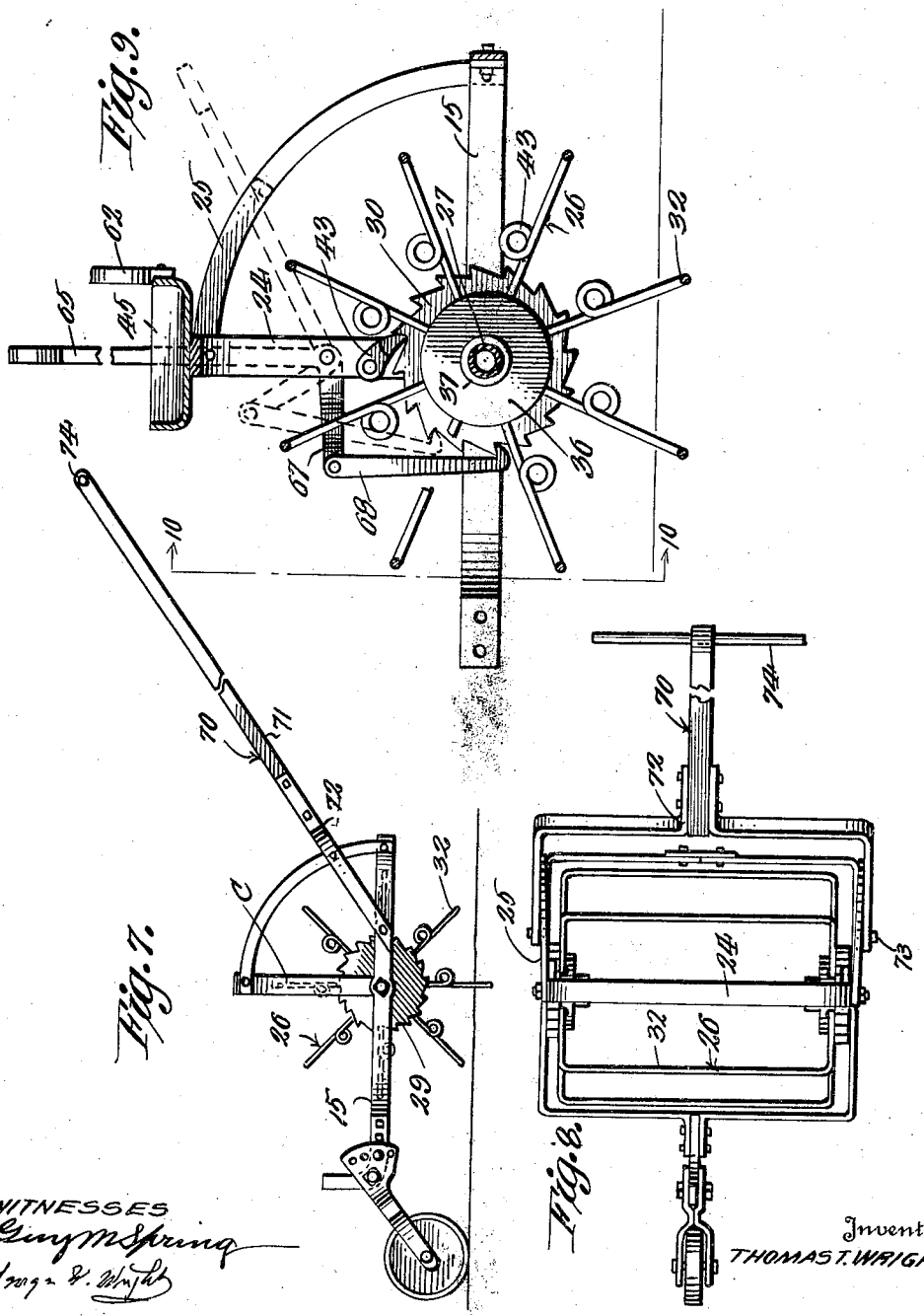

May 13, 1930.  T. T. WRIGHT  1,758,384
WEEDER
Filed Aug. 28, 1926   4 Sheets-Sheet 4
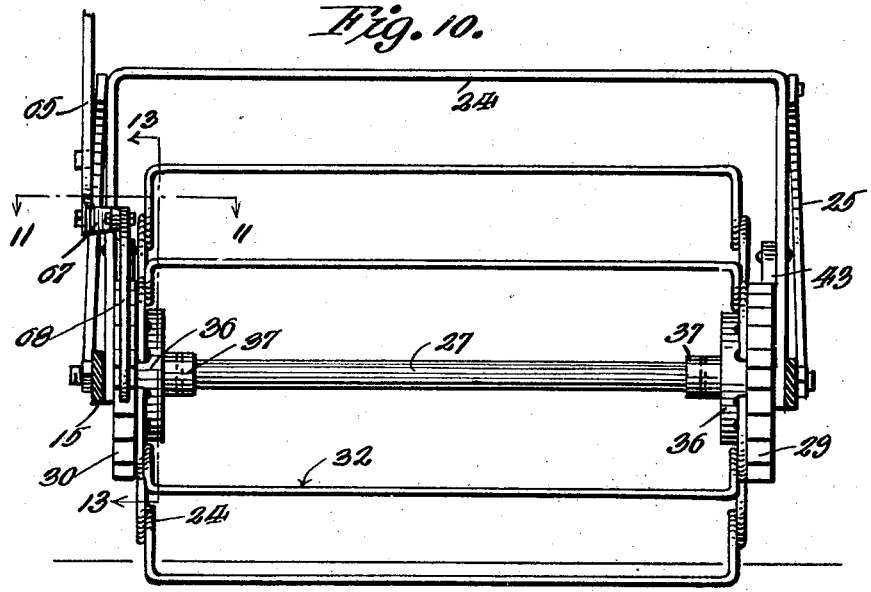
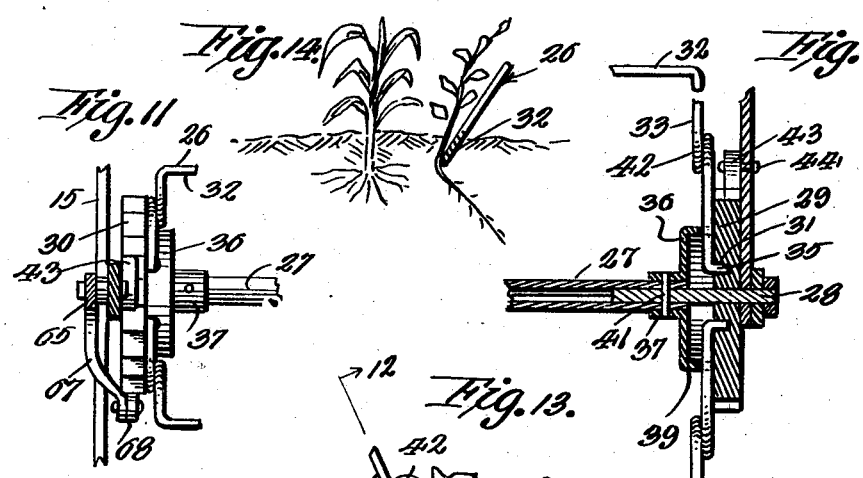
WITNESSES
Inventor
THOMAS T. WRIGHT
By
Attorney Patented May 13, 1930

1,758,384

UNITED STATES PATENT OFFICE

THOMAS T. WRIGHT, OF MACON, MISSOURI

WEEDER

Application filed August 28, 1926. Serial No. 132,250.

This invention relates to cultivators or weeders and the primary object of the invention is the provision of a novel device for pulling weeds between rows of growing plants without disturbing the subsoil and without injuring the plants or roots thereof.

Another prime object of the invention is the provision of a weeder or cultivator having novel weed pulling bars adapted to enter the ground just below the surface thereof for engaging and pulling the weeds from the ground, the bars functioning to agitate the mulch or top soil without disturbing the subsoil, thereby insuring the proper supply of moisture to the plants from the ground by capillary attraction.

A further object of the invention is the provision of a weeder having weeder bars adapted to travel close under the top soil, whereby the device can be used successfully close to growing plants without injuring the roots thereof, the weeder bars being positioned above the lateral roots of the growing plants and thus out of the path thereof.

A further object of the invention is the provision of a plant weeder embodying a supporting frame and a rotatable drum having a plurality of spaced weeder bars for traveling movement in the ground, the drum being normally locked for preventing rotation of the drum when the frame is being drawn over a field, thereby insuring the proper engagement of the weeder bar with the weeds with a minimum amount of draft on the draft animals, the lock being so arranged as to permit the drum to be rotated in a reverse direction from the normal line of draft whereby a new bar can be placed in the ground and the other bar cleared from weeds, trash and the like when the same accumulates thereon.

A still further object of the invention is to provide an improved weeder of the above character which will be durable and efficient in use, one that is simple and easy to manufacture and one which is susceptible of use in connection with a conventional cultivator frame or as an independent unit.

With these and other objects in view the invention consists in the novel construction, arrangement and formation of parts, as will be hereinafter more specifically described, claimed, and illustrated in the accompanying drawings, in which:

Figure 1 is a top plan view of the weeder showing the same as a horse drawn type.

Figure 2 is a side elevation of the same,

Figure 3 is a side elevation of the weeder showing the same connected with a conventional cultivator, the cultivator blades and arms being removed, Figure 4 is a fragmentary top plan view of the cultivated showing the improved weeder connected therewith, Figure 5 is a fragmentary rear elevation of the weeder removed from the cultivator frame, Figure 6 is a fragmentary perspective view illustrating the novel means employed for connecting the weeder with the cultivator, Figure 7 is a side elevation of a weeder of the hand type, Figure 8 is a top plan view of the same, Figure 9 is an enlarged transverse section through the weeder illustrating the novel means employed for manually rotating the drum when it is desired to bring a new weeder bar into action and to clear the old weeder bar from weeds and the like, Figure 10 is a section taken on the line 10—10 of Figure 9 looking in the direction of the arrows, Figure 11 is a horizontal section taken on the line 11—11 of Figure 10 showing the means for rotating the drum, Figure 12 is a section taken on the line 12—12 of Figure 13 looking in the direction of the arrows illustrating the novel formation of the drum and the means for holding the weeder bars in position, Figure 13 is a detail section taken on the line 13—13 of Figure 10, Figure 14 is a diagrammatic view illustrating one of the weeder bars in action.

Referring to the drawings in detail, wherein similar reference characters designate corresponding parts throughout the several views the letter A generally indicates a weeder of the horse drawn type. This weeder A comprises an open rectangular frame 15 which can be formed from strap iron or the like. This frame at its transverse center and at the front thereof is provided with a suitable draw head 16 to the upper end of which can be connected a suitable clevis 17 or the like. The lower end of the draw head 16 supports a yoke 18 carrying a ground wheel 19. This yoke can be made adjustable whereby the ground wheel can be moved varying distances from the frame so as to adjust the frame relative to the ground. As shown this yoke is rockably mounted as at 20 to the draw head and is provided with a plurality of spaced openings 21 beyond its pivot point. A suitable pin 22 is adapted to be placed through any one of said openings and through the head for holding the yoke in adjusted position. The rear end of the frame has bolted thereto rearwardly and upwardly extending handles 23 the rear ends of which can be provided with hand grips similar to ordinary plow handles. The frame 15 has bolted thereto at its longitudinal center an inverted U-shaped frame bar 24 and this frame bar is braced by rearwardly extending arcuate brace bars 25 which extend to the rear end of the frame 15. The handles 23 can also be bolted to these arcuate brace bars.

This frame 15 supports the novel weeder drum 26 which forms one of the salient features of this invention. The drum 26 includes a hollow tubular shaft or axle 27 and the terminals thereof have threaded therein or otherwise secured thereto outwardly extending stub axles 28 which are journaled in bearings carried by the sides of the frame 15 at the longitudinal center thereof. Secured to the stub axles 28 inward of the sides of the frame are ratchet wheels 29 and 30. The inner faces of these ratchet wheels around the axial center thereof are provided with an annular row of sockets 31 for a purpose, which will be hereinafter more fully described. The drum also includes a plurality of equidistantly spaced weeder bars 32 which are of a substantially U-shape. Each of the weeder bars 32 include resilient side arms 33 and the free terminals of the arms 33 of the weeder bars 32 are provided with laterally extending feet 35 which are adapted to be sprung into the openings 31 whereby the bars can be readily removed or placed in position when desired. As shown these bars extend in spaced parallel relation relative to the axle 27 and the sockets 31 are preferably formed of a slightly greater diameter than the feet 35 for a purpose which will hereinafter appear. In order to hold the weeder bars 32 in proper position holding caps 36 are provided. These caps include a hub sleeve 37 which engages the axle 27, and an annular flange 39 which extends into engagement with the inner faces of the ratchet disks or wheels. The flanges 39 are provided with notches 40 for receiving the arms 33 of the weeder bars and the caps 36 are held in position against movement in any desired way such as by the use of pins 41 which extend through the axle and the hub sleeve 37. The notches 40 are also preferably formed slightly wider than the diameter of the arms of the rods so that the rods will be allowed certain play to prevent breakage thereof in case the rods hit a hard object such as a rock. If preferred the arms 33 of the weeder rods can be provided with spring coils 42 so as to add to the resiliency of the bars and thus further prevent the breakage thereof when the bars are in action. When the device is in use the drum is held against rotation during the pulling of the weeder over a field so that only one or two weeder bars (as the case may be) will be in engagement with the ground and to accomplish this I provide dogs 43 which are pivoted as at 44 to the frame bar 24. The dogs and ratchet teeth are so arranged as to prevent rotation of the drum when the device is being pulled across the field but will allow the drum to rotate when the weeder is pulled backward. This allows a new weeder bar to come into engagement with the ground and the consequent raising of the other weeder bar previously in engagement with the ground which allows the clearing of said weeder bar from weeds and the like. In actual practice, when the weeder drum is turned to bring a new rod in engagement with the ground, the jar of the weeder will loosen the weeds and trash from the bar lifted from the ground and thus automatically clear the bar.

The device is operated as follows:—The draft animals are hitched to the clevis 17 and the weeder is drawn across the field between the rows of plants and the weeder bar enters the ground just below the top soil and above the subsoil. This allows the weeder bars to come in contact with the plants below the surface of the ground and pull the weeds out of the same. Owing to the fact that the weeder bars operate just below the top soil, the subsoil is not agitated and only the dry mulch on top of the subsoil is worked, which allows the proper capillary action of the moisture to continue. This position of the weeder bars allows the weeder to be driven very closely to the plants as the weeder bars will be above the lateral roots of the plants being cultivated and will thus not injure the same.

If preferred a pan 45 can be placed upon the top of the frame bar 24 and suitable weights can be placed in this pan so as to hold the weeder bars in engagement with the ground when the weeder is being operated over relatively hard ground. In Figures 3 to 5 inclusive I have shown the weeder incorporated with a conventional cultivator frame B. As shown the cultivator B includes the usual arched axle 50 having the beam 51 connected with the upper end thereof. The terminals of the axle 50 are provided with the usual axle skeins 52 on which the wheels 53 are mounted. The ordinary cultivator beams and blades are removed when the weeder is used with the cultivator frame and a weeder is placed on each side of the arched axle. The weeder is constructed substantially the same as the weeder of the horse drawn type with the exception that a draw head 54 of a different type from the draw head 16 is associated with the frame 15. In this instance the draw head 54 is provided with a relatively long upstanding arm 55 having a plurality of openings 56 anyone of which is adapted to receive the connecting pivot pin 57 of a pull bar 58. This pull bar 58 is twisted intermediate its ends so that the forward portion thereof will lie in a horizontal plane and this pull bar is pivotally connected as at 59 to a head 60 which is connected by means of a clamp 61 with the arched axle 50. This connection allows swinging movement of the weeder in a horizontal plane whereby the weeder may be shifted toward or away from the growing plants. In order to facilitate the shifting of the weeder the same is provided with stirrups or loops 62 which are arranged adjacent to the driver's seat of the cultivator whereby the loop or stirrups can be conveniently reached by the feet of the operator.

In order to limit the swinging movement of the weeders in a horizontal plane, the head 60 is provided with side flanges 63. This will prevent shifting movement of the weeders when the device is being operated on a hillside.

When the weeder is being operated in conjunction with a cultivator frame it may not be convenient to back the cultivator for rotating the drum to shift the position of the weeder bars and I have therefore provided manual means for rotating the drum. This means includes an operating hand lever 65 pivoted at its lower end as at 66 to the frame bars 24. The lower end of the lever is provided with a forwardly projecting arm 67 having its free end provided with a pivoted dog 68 for engaging one of the ratchet disks. By operating the lever 65, it is obvious that the drum can be rotated and the position of the weeder bars shifted. However in cases where the weeders are used in multiples it will be more desirable to back the cultivator, so that all of the drums of the weeders will be rotated synchronously.

In Figures 7 and 8 I have shown a weeder of the hand type and this weeder is indicated by the reference character C. This weeder is constructed substantially the same as the weeder shown in Figures 1 and 2 but is preferably made of lighter material. I also prefer to provide a handle 70 whereby the weeder can be readily pushed. This handle 70 consists of a straight bar 71 having a yoke 72 secured thereto at its lower end. The arms of the yoke are pivoted as at 73 to the frame 15 of the weeder adjacent to the rear end thereof. The upper end of the bar 71 has connected therewith a cross handle 74 which constitutes hand grips which allows the convenient operation of the lever.

In Figure 14 I have shown the relation of a weeder bar relative to a growing plant and a weed growing in close proximity to the plant. It is to be noted that the plant is of the lateral root type and that the weeder bar is disposed above the roots so that the roots will not be injured when the weeder bar is operated in close proximity thereto.

From the foregoing description it can be seen that I have provided a novel weeder which will be of light draft and which can be operated in close proximity to growing plants without injury thereto and which will not disturb the formation of the subsoil.

Changes in details may be made without departing from the spirit or scope of this invention, but:

What I claim as new is:

1. A weeder comprising a frame, a drum rotatably carried by the frame including a plurality of resilient ground engaging members extending transversely of the line of travel of the weeder, at least one of which is in engagement with the ground during movement of the weeder, and manual means on said frame for positively rotating the drum for moving new ground engaging members into engagement with the ground to allow the vibration of the weeder members taken from the ground to clear the same from obstructions.

2. A weeder comprising a frame, an axle rotatably carried by the frame, plates secured to the axle adjacent to the opposite ends thereof, each having an annular row of openings concentric with said axle, and a plurality of U-shaped weeder members having laterally extending feet adapted to be sprung into said openings, whereby said weeder members can be conveniently removed and replaced in case of breakage.

3. A weeder comprising a frame, an axle rotatably carried by the frame, plates connected with the axle, each having an annular row of openings concentric with the axle, a plurality of U-shaped weeder bars having laterally extending feet adapted to be sprung into said openings, and caps detachably secured to the axle for engaging said plates having notches therein for receiving the arms of the weeder bars, the width of said notches being slightly greater than the diameter of the arms of the weeder bars.

4. A weeder comprising a frame, a drum rotatably carried by the frame having a plurality of equidistantly spaced radially extending weeder bars, means for preventing rotation of the drum in one direction, and manual means for rotating the drum in the opposite direction.

5. A weeder comprising a frame, a drum rotatably carried by the frame including a plurality of ground engaging resilient members extending transversely of the line of travel of the weeder at least one of which is in engagement with the ground during forward movement of the weeder, ratchet plates connected with and forming a part of the ends of the drum, dogs carried by the frame engaging the ratchet plates and locking rotation of the drum on forward movement of the weeder and for allowing rotation of the drum on backward movement of the weeder, and manual means including a manually actuated lever rockably carried by the frame and a dog for engaging a ratchet plate for positively rotating the drum on backward movement of the weeder for bringing another ground engaging member into ground engaging position and to allow the clearing of the weeder bar ejected from the ground of obstructions incident to the vibration of the weeder during use.

In testimony whereof I affix my signature.

THOMAS T. WRIGHT.